W. E. WINE.
LATERAL MOTION BEARING.
APPLICATION FILED SEPT. 15, 1917.
1,277,802.
Patented Sept. 3, 1918.
2 SHEETS—SHEET 1.
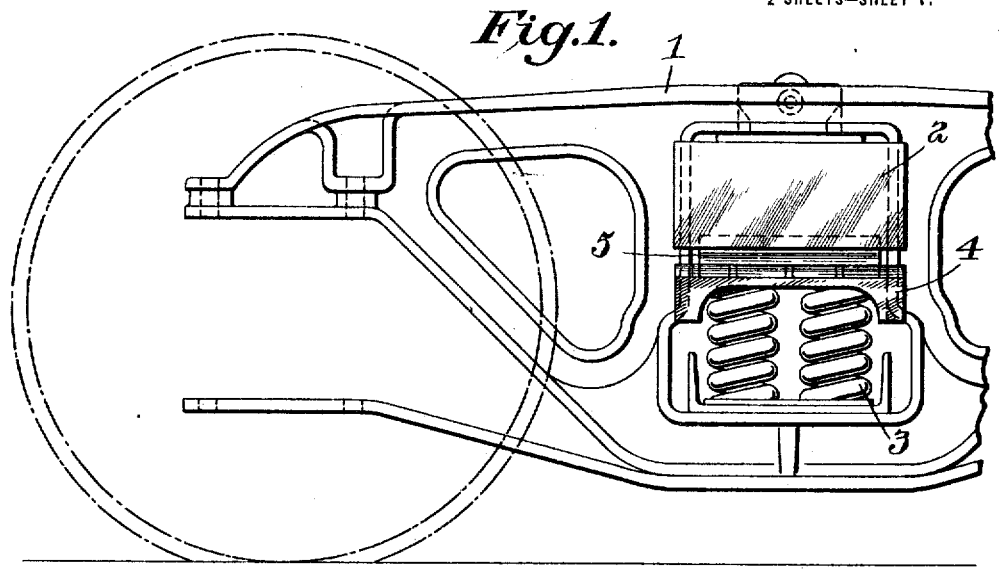
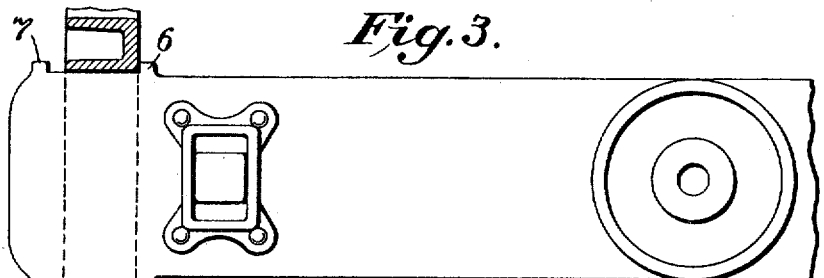
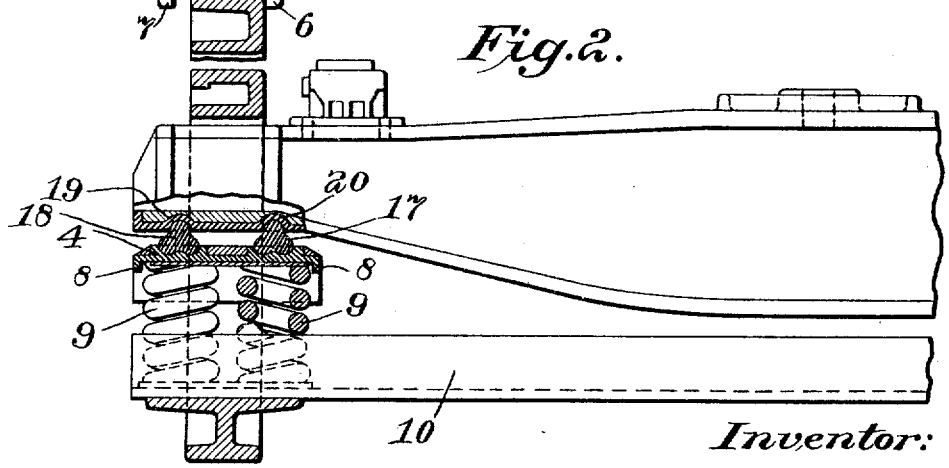
Inventor:
William E. Wine,
by Parker Cook
Atty.

W. E. WINE.
LATERAL MOTION BEARING.
APPLICATION FILED SEPT. 15, 1917.

1,277,802.

Patented Sept. 3, 1918.
2 SHEETS—SHEET 2.

Inventor:
William E. Wine,
by Parker Cook
Atty.

though what I have shown for the sake of illustration.

UNITED STATES PATENT OFFICE.

WILLIAM E. WINE, OF TOLEDO, OHIO.

LATERAL-MOTION BEARING.

1,277,802. Specification of Letters Patent. Patented Sept. 3, 1918.

Application filed September 15, 1917. Serial No. 191,580.

*To all whom it may concern:*

Be it known that I, WILLIAM E. WINE, a citizen of the United States, residing at Toledo, in the county of Lucas and State of Ohio, have invented certain new and useful Improvements in Lateral-Motion Bearings, of which the following is a specification.

My invention relates to a new and useful improvement in bearings for trucks and particularly to a lateral motion side bearing, that is, provision is made to take up the lateral motion of the car body in respect to the truck frames.

It is well known that the greatest wear of the wheel flanges of car trucks is caused by the bolster being out of center and the wheel flanges being thrust against the rails in rounding curves. A good many lateral motion devices have been disclosed for preventing such excessive wear to the wheel flanges but their chief objection is that they normally offer very slight response to the movement of the truck bolster out of center so that a constant swaying or slight lateral movement of the truck wheels is permitted, this being so even when running on straight or nearly straight tracks and at this time there is no occasion for any such lateral movement; on the contrary better running action will be produced by keeping the truck bolster centered.

I have overcome the above defects by using 3-point frictional rockers which are interposed between the truck bolster and a base plate positioned directly over the springs. These frictional rockers are gravity held with all their three apices sustaining the load weight under all normal conditions.

In rounding a curve the wheel flanges first feel the force of the change in direction and unless this force be properly directed and absorbed through the truck, the wear on the wheel flanges, rails and couplers will be excessive and the life of the parts above mentioned will be shortened. The 3-point frictional rockers as indicated maintain their normal position when the trucks are traveling on the straight track and possibly in rounding a slight curve providing the car is traveling at an ordinary speed. If, however, the lateral force is greater than that ordinarily met with, the frictional rockers will shift in their pockets from their normal intermediate position and permit as much more lateral play of the bolster as may be required to absorb the shock or lateral strain and prevent the wheel flanges from being forced excessively against the rails. Furthermore, the frictional rockers will tend to raise the the truck bolster transferring the lateral thrust into a vertical one, and each rocker will shift toward a limit on an excessive thrust so that the same will have two apices contacting with the body bolster and practically lock in the upper portion of the bearing plate of the truck bolster.

It might be mentioned at this time that my lateral motion bearing is a frictional one wherein the rockers, although spoken of as shifting, really frictionally contact within and move the lower plate and the truck bolster, and the greater the lateral thrust the greater the frictional contact. Furthermore, after the rocker has shifted a certain degree it will be so positioned that it is substantially locked in the upper portion of the truck bolster. Again the bearings are so arranged that should the thrust take the bearings beyond their natural limit of travel the second apex of the bearing will come into play to lift the truck bolster still higher than was possible by the first one, this further taking up the lateral strain and changing it to a vertical one. A good many bearings simply have rollers interposed between them so that a sliding contact is obtained between the relative parts rather than a frictional contact as in the bearing herein disclosed. Other disadvantages of the type of bearing using a round roller are that on straight tracks they continually rock from side to side and not only wear the roller flat but wear a groove in the bearing, and after working in this manner for some time it is impossible for any side thrust to be great enough to cause the roller to roll in its natural and proper way.

Still other objects of my invention are to provide a lateral motion bearing that will be extremely simple in operation and consists of but three parts, a base plate and two frictional rockers, the truck bolster, however, being so arranged as to coöperate with the rocker bearings when placed in position.

Furthermore, the frictional rockers are interchangeable and as they are in the shape of an equilateral triangle there is no danger that the bearing may not be properly assembled. In most of the lateral motion devices the rocker or the bearing is not susceptible to a change in position, that is, if made in the form of a triangle they are in the form of an isosceles triangle, or are formed having a long shank and two relatively short bearing points making it impossible to change the position of the rocker or bearing with relation to itself.

Furthermore, by having the rockers equilateral in shape they can be more quickly handled by the workmen when assembling or when overcoming any slight irregularity in their manufacture as all three apices are the same size and shape. In other words, the rocker bearing may be held in any position to grind off or smooth the same rather than pick out one long leg or short leg, which would be necessary in a rocker bearing of any other shape.

In the accompanying drawings wherein like characters indicate like parts throughout the several views, Figure 1 is a side elevation of a truck frame showing the lateral motion device in position and the outline of the wheel being shown in dotted lines.

Fig. 2 is an end view showing the lateral motion device in section and a part of the truck bolster being broken away for the sake of clearness.

Fig. 3 is a top plan view of the truck bolster showing the relative position of the lateral motion bearing and showing a side bearing on the bolster, but which forms no part of my invention.

Figure 4:
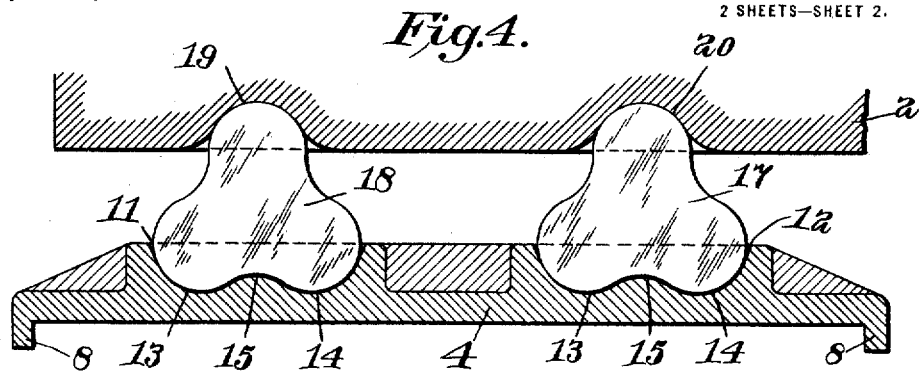
Fig. 4 is a detail sectional view showing the base plate, the rocker bearings in position and a part of the under portion of the truck bolster, the bearings, plate and bolster all in their normal positions.

Referring now to the drawings and to Fig. 1 for the moment, it will be seen that a truck frame 1 is shown which extends between the wheels, a truck bolster 2, the springs 3, a base plate 4 and the rocker bearings 5 in said base plate. The ordinary position of a lateral motion device of this kind is well understood and it is not thought necessary to go into the explanation of the further parts shown in this view.

It is to be understood that my lateral motion device may be used in any form of truck, it being placed simply between the columns and a base plate covering the upper portions of the springs. The bolster, as is usual in this type of truck, works between the columns of the side frames and in many instances, is provided with the inner lugs 6 and the outer lugs 7.

Figure 6:
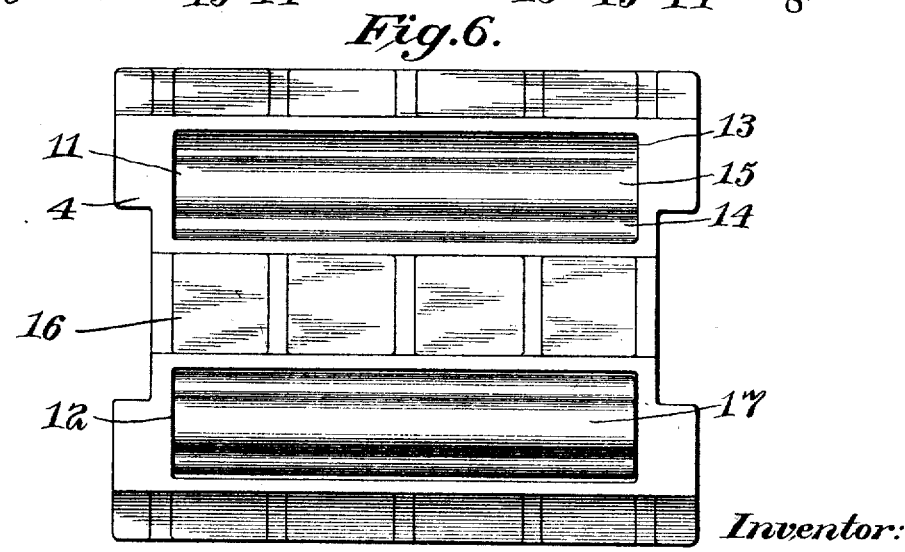
Fig. 6 is a top plan view of the base plate showing one rocker bearing in its pocket and the other rocker being removed.

Referring now to the other figures, it will be seen that the invention comprises in particular a base plate 4, a top plan view of which is clearly shown in Fig. 6, which plate 4 is provided with the downwardly extending lugs 8 so it will remain in position when placed over the springs 9, which springs rest in the transom 10 which ties together the lower parts of the two side frames. This base plate 4 is provided with two pockets 11 and 12, extending parallel to the frames. These pockets in themselves are provided with two grooves 13 and 14 leaving the ridge portion 15 extending centrally throughout the main pocket. The plate may be reinforced or ribbed as at 16 although the form of ribs or strengthening parts may be changed without in any way interfering with the invention.

Located within these pockets are the two frictional rocker bearings 17 and 18 which rocker bearings are in the form of an equilateral triangle, that is, the apices are all the same distance from the center of the rocker.

A rocker of this form has several advantages; one, that there is no danger of the rocker not being properly positioned in the base plate, and they are of course interchangeable one with another. A further advantage will be hereinafter noted.

Referring for the moment to Fig. 2, it will be seen that the outer end of the bolster on its under portion is also formed with two depressions 19 and 20, the said depressions conforming exactly to the arc of the apices of the rockers 17 and 18. These depressions 19 and 20 extend, of course, in the same direction as the pockets 11 and 12 in the base plate 6 and in the drawings I have shown these depressions formed integral in the truck bolster, but it will be understood that a plate might be placed on the truck bolster with these depressions in it if it is desired to place my bearing on a truck that is already in service.

Figure 5:
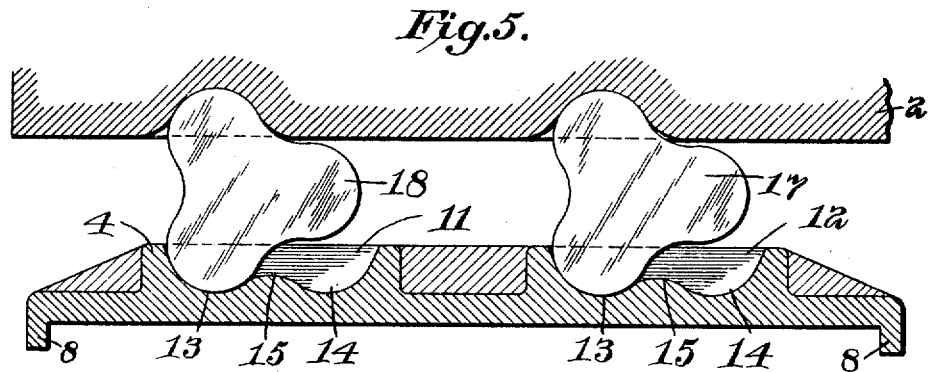
Fig. 5 is a similar view but showing the rockers in a tilted position or the position that they will assume from a lateral thrust.

Referring now to the action of the bearing which is clearly disclosed in Figs. 4 and 5, it will be seen that when the rockers 17 and 18 are in their normal position the upper apices of the rocker bearings fit closely within the depressions 19 and 20 and the lower apices of the bearings 17 and 18 fit snugly within the pockets 11 and 12 and furthermore in the depressions 13 and 14. From this construction it will be seen that there is a 3-point contact between the base plate 4 and the truck bolster 2, so that there is less tendency of wear on the rockers than if there were simply two points of support.

Assuming now that the truck is rounding a curve, the truck bolster 2 and the rockers 17 and 18 will assume the positions as shown in Fig. 5 and a line drawn through the centers of the outer apices instead of being in an angular position would be in a vertical position. The movement therefore of these bearings to the position shown in Fig. 5 will raise the truck bolster with relation to the base plate 4 and at the same time causing a great amount of frictional contact between the rocker bearings and the base plate and truck bolster.

By forming the rocker bearings as shown the lateral thrust will be overcome by the necessary raising of the truck bolster and a vertical force exerted, which, of course, absorbs the lateral thrust and which is to be desired. Should an excessive lateral thrust be thrown on the truck bolster, the rockers 17 and 18 will be forced still farther outwardly than shown in Fig. 5 so that not only will the apices that fit within the depressions 19 and 20 contact with the truck bolster, but the intermediate apices will also be raised so that they will also contact and substantially lock with the truck bolster, thereby causing a still greater frictional contact and tending to raise the truck bolster still higher which force of course will be exerted in a vertical line thereby still further overcoming the lateral movement.

It is to be understood that in Fig. 5 the force is assumed to be exerted from the right hand side of the drawings to the left, but should the force be exerted from the opposite side the parts will operate in exactly the same manner, the rockers simply assuming a right hand tilted position rather than a left hand tilted position.

From the foregoing it will be seen that first my lateral motion device consists mainly of a base plate provided with pockets which are formed in the particular manner and two frictional rocker bearings which are in the shape of an equilateral triangle which normally assumes an upright position and which are frictionally engaged between the truck bolster and the base plate so that any lateral motion will cause the bearings to shift and raise the truck bolster, which raising of course transforms a lateral thrust into a vertical one which is to be desired. Furthermore, any excessive lateral thrust will cause the equilateral rockers to further shift in their pockets so that two apices of each bearing will lock with the truck bolster rather than just one apex of each rocker.

I am aware that roller bearings have been used in devices of this kind and I am also aware that frictional rockers have been used and I do not claim broadly the same.

What I do claim and desire to secure by Letters Patent, is:—

1. A lateral motion bearing comprising a base plate, said plate provided with a pocket therein, said pocket provided with two grooves therein, an equilateral shaped rocker in said pocket and resting in said grooves in said pocket.

2. A lateral motion bearing comprising a base plate, said plate provided with pockets therein, said pockets provided with two grooves therein, equilateral shaped rockers in said pockets and resting snugly in said grooves in said pockets.

3. A lateral motion bearing comprising a base plate provided with pockets therein, two grooves in said pockets thereby leaving a raised portion between said grooves, equilateral shaped rockers in said pockets and the rockers and grooves in said pockets so shaped that the two lower apices of the rockers fit snugly in the grooves in said pockets and the raised portion between said grooves fits between the apices of said rockers.

4. A lateral motion bearing comprising a base plate provided with pockets therein, two grooves in said pockets leaving a centrally extending rib between the same, the height of the rib being equal to the depth of the depressions, rocker bearings in the shape of equilateral triangles within said pockets, said rockers being depressed between each apex, the apices of the rockers being rounded and their arc similar to the arc of the grooves in the pocket, the arc of the depression between the apices of the rockers also similar to the arc of the intermediate rib in the pockets so that the rockers in their normal position contact through their entire base when in the pockets of the base plate.

5. In combination a car truck, a truck bolster, springs carried by said truck, a base plate fitting over said springs, said base plate provided with two pockets positioned parallel with the frames of the truck, equilateral shaped rockers bearing in said pockets, their apices being rounded, said truck bolster having depressions on its ends on the under side, the arc of the depressions similar to the arc of the rockers, and said rockers adapted to slip in said pockets and said depressions to overcome the lateral strain.

6. In a lateral motion device the combination of a car truck and a truck bolster, springs carried in the frames of said truck, a base plate fitting on said springs, said base plate provided with pockets therein, said pockets having arced grooves therein and an intermediate rib extending between said grooves, equilateral shaped rocker bearings having their apices rounded, and said bearings also having depressions between the said apices so that said rocker bearings fit snugly throughout their base in said pockets in said base plate, said truck bolster also provided with depressions therein, the arc of said depressions conforming to the arc of said rocker bearings, the said bearings adapted to shift in the pockets and in the depressions to overcome the lateral strain.

7. In a lateral motion device the combination of a car truck and a truck bolster, said truck bolster provided with two depressions at its outer ends, springs carried in the frames of the car truck and a base plate fitting snugly on said springs, pockets in said base plate and grooves in said pockets, equilateral shaped frictional rocker bearings fitting within said pockets, the base of the rocker bearings being supported by the said base plate and an apex of each rocker bearing fitting within the said depression in said truck bolster, said rocker bearings adapted to shift in said pockets and depressions on the receipt of a lateral thrust, the said bearings traveling toward the limit on an excessive thrust to where the truck bolster will be supported by two of the apices of said bearings and simply one apex of each bearing contacting with the base plate.

8. In a lateral motion device the combination of a truck frame and truck bolster, springs carried by said truck, a base plate fitting on said springs provided with pockets therein, said truck bolster provided with depressions at its ends, equilateral shaped rocker bearings fitting within the pockets in said base plate and one of the apices of each bearing normally fitting within a depression in the truck bolster and two of the apices fitting within the base plate, said rockers adapted to shift, however, to a point wherein two of the apices of each bearing will contact with the truck bolster leaving but one apex contacting in the pocket of the base plate.

9. In a lateral motion device the combination of a car truck and a truck bolster, springs carried by said car truck, a base plate fitting on said springs, said base plate provided with pockets having two depressions formed therein, said truck bolster provided with depressions therein conforming to the depressions formed in the pockets of the base plate, equilateral shaped rocker bearings fitting between said truck bolster and said base plate, the normal position of said rocker bearings being upright; one apex of each bearing contacting with the truck bolster and the remaining two apices contacting with the base plate, said bearings adapted to shift from said position to a position wherein two apices of each bearing will contact with the truck bolster and the remaining apex of each bearing contacting in the base plate and the said shifting of said bearings changing the lateral motion to a vertical one to thereby overcome said lateral motion.

In testimony whereof I affix my signature.

WILLIAM E. WINE.